United States Patent [19]
Bissi et al.

[11] Patent Number: 4,457,565
[45] Date of Patent: Jul. 3, 1984

[54] TWO-PIECE MASTER TRACK LINK

[76] Inventors: Maurizio Bissi, No. 4 Via Cammello, Ferrara; Andrea Cocco, No. 10 Via Monte Piana, Castelfranco Venetao, (Prov. of Treviso), both of Italy

[21] Appl. No.: 401,324

[22] Filed: Jul. 23, 1982

Related U.S. Application Data

[63] Continuation-in-part of Ser. No. 213,547, Dec. 5, 1980, abandoned.

[30] Foreign Application Priority Data

Dec. 5, 1979 [IT] Italy ............................. 51000 A/79

[51] Int. Cl.$^3$ ............................................. B62D 55/20
[52] U.S. Cl. ..................................... 305/58 R; 305/39
[58] Field of Search ................. 59/84; 305/39, 53, 54, 305/58 R

[56] References Cited

U.S. PATENT DOCUMENTS

| | | | |
|---|---|---|---|
| 1,980,126 | 11/1934 | Williams | 59/84 |
| 3,096,661 | 7/1963 | Reinsma et al. | 305/54 X |
| 4,105,260 | 8/1978 | Blunier et al. | 305/54 |
| 4,365,848 | 12/1982 | Grilli et al. | 305/58 R |

FOREIGN PATENT DOCUMENTS

| | | | |
|---|---|---|---|
| 2400481 | 7/1975 | Fed. Rep. of Germany | 305/39 |
| 1750824 | 6/1978 | Fed. Rep. of Germany | 305/58 R |

Primary Examiner—David A. Scherbel
Attorney, Agent, or Firm—Michael J. Striker

[57] ABSTRACT

A two-piece master track link for connecting an endless track for heavy duty track vehicles, consists of two half-links each having a mating surface comprising of a recess and a hook-like projection, so that the hook-like projection of one link part is received in the recess of the other link part. The recesses and hook-like projections are so shaped that in assembling of the half links by screws or bolts all the mating surfaces adhere to one another and prestress the screws owing to the configuration of their profiles. Said profiles consist each of an oblique portion merging into a substantially horizontal portion merging in turn into a central portion inclined with respect to an imaginary vertical plane at the angle of friction of about 10° and sized to have a ratio with respect to said oblique portion ranging between 1 to 4. An imaginary horizontal plane including the axes of said pin and bushing bores divides said central portion in a first central sector and a second central sector, the size ratio between said first and second sector ranging from 0 to infinite in dependence upon the weight and thus stiffness ratio between said first and second link parts for balancing the elastic deformability of said two half-link whereby by tightening said screws into the track link the oblique portions of said first link part tend to slightly displace relative to oblique portions of said second link part so that the entire contacting surfaces of the both link part adhere to one another owing to the mutual elastic deformation of the link parts, thus also avoiding loosening and unscrewing of said screws during operation.

3 Claims, 4 Drawing Figures

TWO-PIECE MASTER TRACK LINK

CROSS-REFERENCE TO A RELATED APPLICATION

This is a continuation-in-part of application Ser. No. 213,547 filed Dec. 5, 1980, now abandoned.

BACKGROUND OF THE INVENTION

This invention relates to a two-piece master track link for joining together the ends of an endless track as used in bulldozers, track-laying tractors and other heavy-duty track vehicles.

An endless track for tractors is usually formed by a plurality of shoes fixed by bolts to links which in turn are mutually and rotatably connected by means of pins and bushings.

It is conventional to provide a coupling pin or a junction link in each endless track. This piece, which is firmly retained in position during the operating condition, allows the removal of the track from the vehicle.

As a general rule (for removing the endless track, particularly during the work on field) a junction link formed by several parts is more practical and easy to handle than the coupling pin, particularly in respect to heavy duty machines.

Moreover, it is required to use a hydraulically actuated tool or a manually actuated hammer for assemblying and disassemblying the endless track at the field of work, thereby rendering the assembly and disassembly of the endless track troublesome and difficult. Further, if the master pin due its tolerances is loosened too much, the master pin tends to be drawn out of the mating portion of the endless track, which may result in damage of the endless track.

For this reason, junction links have been developed, formed of two or more parts, which are connected to one another by lag screws which fasten also the shoe, and are joined by multiple coupling profiles located on a more or less wide zone of the separation line of said parts, either by single tooth interlocking coupling profiles, or by means of connection pins forced in the two parts parallelly to the axis of the locking screws, or by special specific connection shoes.

There are already known several kinds of two-piece master track links. For example, the U.S. Pat. No. 3,427,079 discloses a two-piece master track link including two parts having mating surfaces defining multiple mating serrations arranged generally parallel with the bores in the parts. The link parts interlock at their serrated juncture to form a continuous central link mass for resisting tensile forces exerted on the end portions of the link parts.

It should be pointed out that the central juncture portion of this track link is disposed on the diagonal plane and has a plurality of interlocking serrations. Such a structure is difficult and costly to manufacture, and close tolerances are required to assure optimum coupling of the interlocking surfaces and alignment of the shoe bolts utilized to secure the track shoe to the link part.

The U.S. Pat. No. 4,105,260 also discloses a track link composed of two parts in which joining surfaces are formed with a plurality of mating serrations. Keytype means are provided to reduce or eliminate the shear loads between the track shoe and the link, however without avoiding the above mentioned drawbacks of the plurality of interlocking serrations.

The German patent application No. 1,400,481 discloses a structure of the track link in which the contacting surfaces of the half-links are provided with one or more substantially vertical projections on the central horizontal face of the mating surface of at least one half-link, which projections engage the corresponding recesses on the mating surface of the other half-link.

Obviously, such projections are not adapted for high stresses occuring in the heavy-duty track vehicles.

The U.S. Pat. No. 3,096,661 discloses a two-piece master track link including a notch and a profiled coupling key. The conformation of the profiled key with the notch and thus the junction features of this track link structure can not be adapted for the heavy-duty track vehicles, since only a side wall of that notch and profiled key sustains the stresses exerted on the link.

The U.S. Pat. No. 4,050,750 shows a two-piece master track link which, however, requires a third separate piece for coupling two half-links to one another at their central horizontal mating surface.

This third piece, necessary for coupling the two half-links with one another, provides for its function by a less or more forced coupling, thus rendering uneasy and difficultous the operation of joining and disjoining the master track link.

The German patent application DE No. 30 21 325 discloses a two piece master track link having a coupling surface with a single tooth and a respective recess, said tooth having a small hight which is reduced to a value just necessary for withstanding the traction stress of the chain in the working condition, said tooth being inclined so as to assume an almost orthogonal positttion with respect to the traction force of the chain when this last is wound on the vehicle wheel (about 30°).

Moreover, the central contact zone is arranged in the master link assembly in the symmetrical position with respect both to the pin bore-bushing bore axis and vertical plane parallel to the axes of said bores and passing through the intersection point of said axis and the central contact zone, so that there is wholly missing a balancing of the elastic deformations of the two half-link parts coupled with one another, which parts have a stiffness different therebetween owing to the different transverse size of said half link parts and thus of their weight.

The height of the inclined central contact surface is limited and causes thus a further increase of the stiffness of the master link.

Furthermore, this master link does not offer a sufficient safety against casual opening thereof when the bolts are not yet inserted or are removed during the joining or disjoining operation owing to both said limited height of the central contact surface and an inclination of about 25°–30° of said surface with respect to the vertical plane. Finally, this remarkable inclination causes a considerable part of the traction force of the chain exerted during the work to act onto the connection bolts and since, moreover, said force is variable in dependance on the working conditions and has also a pulsating behaviour, it causes overcharges and possible ruptures of the bolts.

Summarizing, all the known two-piece master track links have the drawback consisting in that the bolts tend to loose and unscrew after a certain time owing to a low elasticity degree of the master link and also in that the coupling surfaces of the two half-links require a high machining precision which increases the production costs, without solving the problem of rendering more easy the joining and disjoining operation of the master track and reducing the forces acting onto the screws and deriving from the working stresses exterted by the chain, which forces may overcharge the screws and cause the rupture thereof.

SUMMARY OF THE INVENTION

It is an object of the invention to avoid the above disadvantages of the two-piece master track links known in the art.

The master track link according to the invention includes two link parts each having a contacting surface and matingly juxtapositioned each other along the contacting surfaces, each of which includes two substantially vertical end portions, two oblique portions extending in two imaginary parallel planes, said end portions merging into respective oblique portions, two substantially horizontal portions extending in two imaginary parallel planes, said oblique portions merging into respective horizontal portions, and a central portion extending between said horizontal portions and being slightly inclined with respect to an imaginary vertical plane so that each contacting surface forms a single hook-like projection and a single recess such that the hook-like projection of one link part is received in the recess of another link part. The central portion and the respective oblique portion form a first and a second side wall, respectively, of the hook-like projection, the size of those walls ranging in a ratio of 1 to 3÷4.

The central portion diverges from the imaginary vertical plane of an angle of about (10°) which is near to the angle of friction of the surfaces to be coupled to one another. In this way only a negligible portion of the (variable) traction stress is transferred onto the connection screws.

As said therebefore with respect to the German DE No. 30 21 325, the two half link parts have a weight which in all two piece master links is different therebetween. In effect, the weights of the half link parts provided with the bushing and that carrying the pin bore range in a ratio of 1 to 1,2+1,4 and cause thus, an unbalance of the elastic deformation of said link parts, if not balanced by said asymmetrical arrangement of the central portion.

Moreover, the central contacting portion is provided in the master link body in a position which is offset with respect to both the pin-bushing axis (main axis of the master track) and transverse axis, orthogonal to the first mentioned axis at its middle point, so as to attain a best possible balancing of the elastic deformations of the two coupled half-link, which would have, otherwise, a stiffness remarkably different from one another.

The hight of the central portion is so great as possible, compatibly with the necessary mechanical strength of the half-links. In this manner it is attained a maximal increase of the elastic behaviour of the links during the tensioning of the connection screws and also a particularly advantageous condition of an easy fitting in and hooling of the two half links with respect to one another during the coupling operation thereof.

Furthermore, the increased hight of the central portion offers a greater safety against an accidental opening of the master link when the connection screws are not yet inserted or are already removed, during the opening or closing operation of the chain.

This advantage is due also to the above said particular arrangement of the central portion with respect to the imaginary vertical plane and to the inclination angle of said central portion, as it will be disclosed hereinafter.

The master link according to the invention has a transverse size which is remarkably increased (excepted the end pin and bushing portions of the half-link) parallely to the axes of the bushing and pin bores, thus remarkably strengthening the structure.

In this manner much greater abutment and hooking surfaces are obtained, with evident advantages, such as reduction of the specific contact pressure and a remarkable increase of the strength of the coupled master track link with respect to the transverse and torsional stresses.

Since for the effectiveness of the master link it is very important to maintain the stability of the connection bolts, which stability is attained by the elastic pre-loading and since a certain percentage of the chain traction discharges onto the bolts, it is extremely important to reduce the pre-loading of the bolts within certain values, while maintaining the self-locking effect.

The above said behaviour of the master link is just attained by increasing the elasticity of the two half link parts by the greater extension of the contact profile and by bilancing as more as possible the elastic behaviour of said half link parts by an asymmetric arrangement of the central contact surface with respect to the horizontal plane containing the axes of the pin and bushing bore.

In this way the two halk link parts are stressed by more homogeneous and balanced forces. The increased elastic deformability of the two half link parts allows to easily maintain a pre-loaded condition of the bolts in several working situations, without an excessive tightening thereof, thus avoiding danger of overloading said bolts, which overloading is always possible owing to jerking or kicks on the chain or particularly heavy working conditions.

The joint contacting surfaces of the half links or link parts are so shaped that in assembling of the half links by screws or bolts all the matching surfaces adhere to one another and prestress the screws owing to the configuration of their profile so that the unscrewing or loosening of the screws during operation is totally avoided.

This effect is attained due to parallel oblique linear portions of the matching surfaces, which oblique surfaces tend to slightly displace on one another when screwed by screws to thereby prestretch them.

The configuration of the matching surfaces provides for easy coupling of the half links with the shoe and with one another.

A further advantage of the claimed invention resides in that the whole hook-shaped juncture surface partakes in the stresses exerted thereon during operation of the track link.

DETAILED DESCRIPTION OF THE PREFERRED EMBODIMENTS

Figure 1:
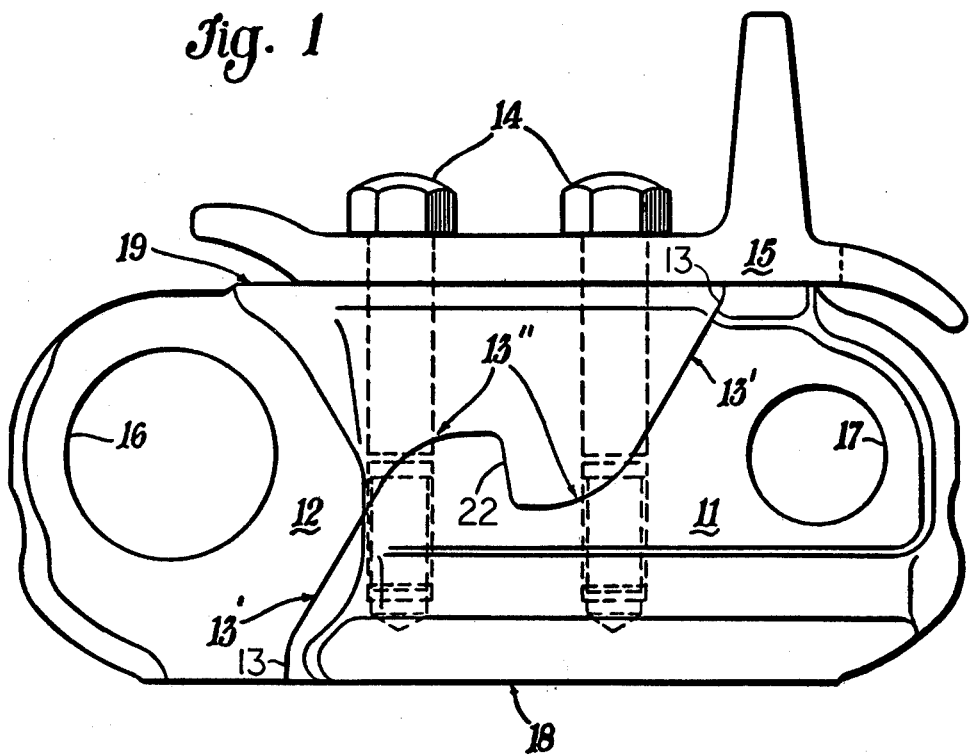
FIG. 1 is an elevational view of the junction link assembly (right), in two parts, connected with a shoe by suitable screws.

Referring now to FIG. 1, the junction track link according to the present invention comprises two superimposed half links 11 and 12 which mate and are engaged along the junction face.

A pair of locking screws 14 (of the long stem type) inserted into two holes 20 connect a shoe 15 and half link 12 on the side of bushing to the half link 11 on the side of the pin. Aligned with holes 20 are two threaded blind holes 21 which are made in the half link 11 to receive locking screws 14.

As it is usual in other similar constructions, one of the half links 12, such as that on the side of bushing, has a seat 16 for coupling with a bushing (not shown) while the other half link 11 has a seat 17 for coupling with a pin (also known and not shown in the drawing); these bushing and pins may be mounted and locked in their positions by means of couplings clamped in their respective seats or by similar locking devices.

In addition, the above half links have the outer sides 1 and 19, opposed to the mating faces thereof and shaped and match so as to form, when the link is assembled, two parallel and flat surfaces.

Outer side 18 of the half link 11 constitutes the rolling surface (on rollers and track tensioning wheels) for the assembled junction link, while the side 19 of half link 12 forms the mounting surface for the shoe 15 of the assembled junction link, which is obtained by means of screws 14 as described above.

Figure 2:
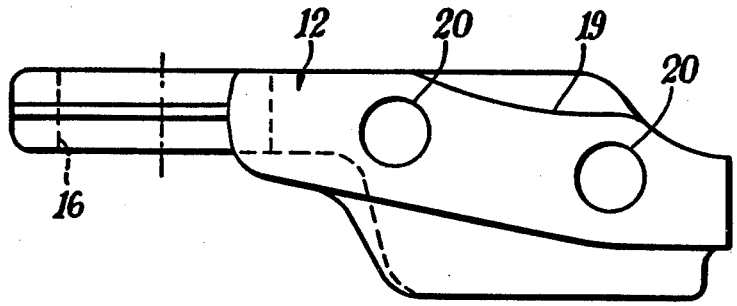
FIG. 2 is a plan view of the half link (right) on the side of bushing (as seen from the shoe)

Referring now to FIG. 2, half link 12 on the side of bushing, beyond the end zone which comprises the seat 16 for the bushing and the area needed for the articulation of the adjacent link, shows a great increase in the transverse dimension, with a proportional increase in the mass.

Figure 3:
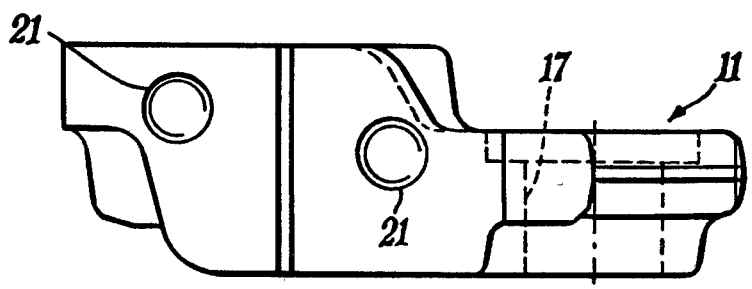
FIG. 3 is a plan view of the half link (right) on the side of the pin (as seen from the mating line)

In the same way, referring now to FIG. 3, half link 11 on the side of the pin, beyond the end zone which comprises seat 17 for the pin and the area necessary for the articulation of the adjacent normal link, also shows a similar strong increase in the transverse dimension, with a proportional increase in the mass.

This mass increase, which concerns all the central zone of the assembled junction track link, has the purpose of obtaining at the same time several results, such as a broader distribution inside the link body of very high stresses due to the traction forces of the catenary, a rest base as large as possible extending along the rectilinear lengths of the mating face of the half links in order to reduce the stress in the material, due to the part of the vehicle weight supported by the link, and the traction exerted by the screws 14.

The increase in the transverse thickness also allows for a greater stiffness of the coupling between the half links along a longitudinal plane of the assembled master track link and reduction in the specific pressure on the mutual contact surface in the joining zone of the two parts, in the center of the mating face.

Referring back to FIG. 1, it will be observed that the end lengths of the mating face change their position so as to cross the external sides 18 and 19, respectively of the assembled junction track link in a direction nearly perpendicular to sides 18 and 19. This has been foreseen in order to increase the sturdiness of the corner zones formed by the intersection of the junction face with external sides 18 and 19 so as to reduce the risk of chipping due to brittleness of the same. Moreover, this allows for a little increase of material in the external side of the forced coupling zone with pin and bushing.

Figure 4:
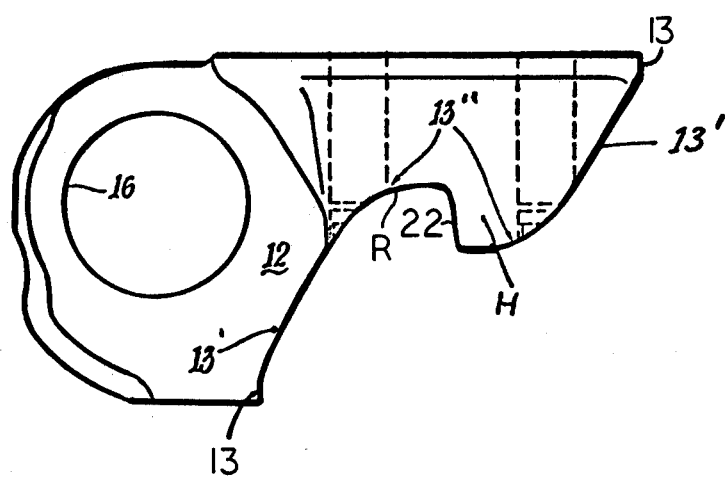
FIG. 4 is an elevational view of the half link on the side of the bushing.

Summarizing, the master track link includes two link parts 11 and 12 each having a contacting surface and matingly juxtarpositioned each other along their contacting surfaces. Each contact surface as seen in FIG. 1, and particularly in FIG. 4 includes two substantially vertical end portions 13, two oblique portions 13', extending in the imaginary planes parallel to each other, the end portions 13 merging into respective oblique portions 13', two substantially horizontal portions 13" extending in two imaginary planes parallel to each other, the oblique portions 13' merging into respective horizontal portions 13", and a central portion 22 extending between opposite horizontal portions 13". Central portion 22 is slightly inclined relative to an imaginary vertical plane or to the planes through which vertical end portions 13 extends. Due to such a configuration each contacting surface forms a single hook-like projection H and a recess R, and in assembly of the half-links the hook-like projection of the link part is received in the recess of another link part.

In assembling of the half links by the screw bolts 14 all the matching surfaces adhere to one another and prestress the bolts owing to the configuration of their profile so that the unscrewing or loosening of the bolts 14 during operation is totally avoided.

This effect is attained due to parallel oblique linear portions 13' and inclined portions 22 of the matching surfaces, which surfaces tend to slightly displace on one another when screwed by screws 14 to thereby prestretch them.

Coming now back to the small inclination of the central portion 22 with respect to the vertical plane, in the working conditions the screws will be charged by an extremely reduced part of the traction force exerted by the chain. Therefore it will be maintained the pretensioning force with which the screws are tightened at the closure of the chain, thus avoiding the main reason of a spontaneous unscrewing thereof.

Moreover, the effect exerted on the screws by said extremely reduced part of the chain traction is balanced by the increased elasticity of the two coupled half-links, which elasticity annuls the overcharge of the screws themselves.

Furthermore, since the opening and closing operations of the chain are usually carried out on the curve sector of the chain at the chain stretching wheel or driving wheel and since in this position the articulation angle between the two adjacent links usually ranges between 25° and 30°, the reduced inclination of the central portion 22 about 10° assumes a position which forms with the direction of the traction force of the chain an angle (75° ca) remarkably smaller than 90°, thus obtaining a selflocking coupling between the two half-links, even if the screws are removed.

This feature is very important for the safety of the person performing the joining or disjoning operations which are otherwise dangerous and renders very easy said operations and the remotion of the shoe, since the chain has a tendency to maintain the master link in its closed and justapposed position.

The configuration of the matching surfaces provides for easy coupling of half links 11 and 12 with one another.

Thus, each half link 11 and 12 has a matching surface consisting of both hook H and recess R with a profile exactly corresponding to the hook which has a first side wall formed by the oblique surface 13' and a second wall formed by the centr surface portion 22, so that in assembling of the two half links the hook of one half link enters the corresponding recess of the complementing half link, whereby the whole hook-and-recess-shaped juncture surface partakes in the stresses exerted thereon during operation of the track link.

The ratio between the sizes of aforementioned second and first wall ranges from 1 to 3÷4.

It will be understood that each of the elements described above, or two or more togehter, may also find a useful application in other types of master track links differing from the types described above.

While the invention has been illustrated and described as embodied in a two-piece master track link, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a master track link having an outer surface for receiving a track shoe, comprising a first link part and a second link part, said first link part being formed with a bore to receive a pin bushing and said second link part being formed with a bore to receive a pin, said first and said second link part each having a contacting surface and matingly juxtapositioned each other along said contacting surface, said first link part having a pair of through holes and said second link part having a pair of threaded blind holes; and a pair of screws passing through the respective through holes and screwed into the respective blind holes of the link parts to connect said shoe to the track link and to secure said link parts to each other, each of said contacting surfaces including two substantially vertical end portions, two oblique portions extending in two imaginary parallel planes, said end portions merging into the respective oblique portions, two substantially horizontal portions extending in two imaginary parallel planes, said oblique portions merging into the respective horizontal portions, and a central portion extending between said horizontal portion and inclined with respect to an imaginary vertical plane, an improvement consisting in that said central portion is inclined at the angle of friction of about 10° to said imaginary vertical plane and is sized to have a ratio with respect to said oblique portion ranging between 1 to 3-4, so that each contacting surface forms a single hook-like projection and a single recess and in assembly the hook-like projection of one link part is received in the recess of another link part so as to assure the contact on the entire contacting surface of said link parts, thus avoiding loosening and unscrewing of said screws during operation.

2. The master track link as defined in claim 1, wherein the distance of an imaginary vertical plane passing through the imaginary horizontal intersection line of said central portion and said imaginary horizontal plane is asymmetrical with respect to the axis of said pin and bushing bores.

3. The master track link as defined in claim 1, wherein on a driving or chain tightening wheel said central portion assumes, owing to its inclination of about 10° with respect to the imaginary vertical plane, a position which is inclined with respect to the direction of the traction force of the chain at an angle (75° ca) remarkably smaller than 90° to obtain a selflocking effect of said two half-link, even after removal of said screws.

* * * * *